United States Patent [19]

Honda et al.

[11] 4,218,412
[45] Aug. 19, 1980

[54] METHOD FOR PREVENTING VAPOR EXPLOSION IN A LIQUID COMMINUTING PROCESS

[75] Inventors: Munetaka Honda; Takuya Tamou; Hisashi Morimoto, all of Toyama, Japan

[73] Assignee: Showa Denko Kabushiki Kaisha, Tokyo, Japan

[21] Appl. No.: 3,421

[22] Filed: Jan. 15, 1979

Related U.S. Application Data

[63] Continuation-in-part of Ser. No. 705,179, Jul. 14, 1976, abandoned.

[30] Foreign Application Priority Data

Jul. 16, 1975 [JP] Japan .................................. 50-86155

[51] Int. Cl.² .............................................. B01J 2/06
[52] U.S. Cl. ...................................... 264/11; 264/40.3
[58] Field of Search ................................ 264/11, 40.3

[56] References Cited

U.S. PATENT DOCUMENTS

| | | | |
|---|---|---|---|
| 3,996,321 | 7/1976 | Weinberger | 264/40.3 |
| 4,124,377 | 11/1978 | Larson | 264/11 |
| 4,143,687 | 3/1979 | Belloci | 264/40.3 |

Primary Examiner—Donald J. Arnold
Assistant Examiner—James R. Hall
Attorney, Agent, or Firm—Oblon, Fisher, Spivak, McClelland & Maier

[57] ABSTRACT

A method for preventing possible vapor explosion in the liquid comminuting process in metal refining comprising comparing pulse pressure generated in the course of liquid comminuting with a fixed reference pressure and adjusting the amount of molten metal thrown into water and the amount of water fed in accordance with the value of comparison.

5 Claims, 14 Drawing Figures 5 milli−seconds/cm 2 milli−seconds/cm

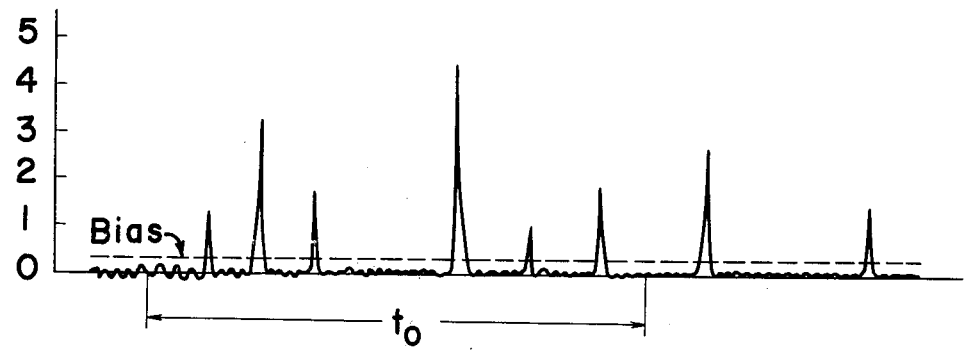
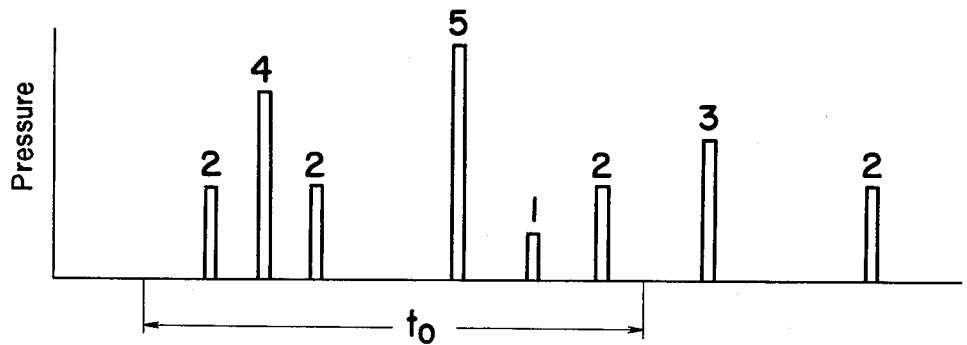
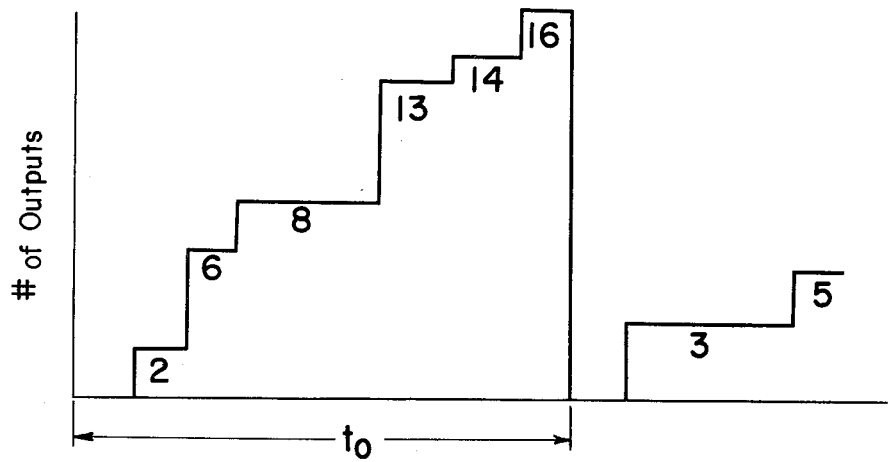

4,218,412

METHOD FOR PREVENTING VAPOR EXPLOSION IN A LIQUID COMMINUTING PROCESS

BACKGROUND OF THE INVENTION

This is a Continuation-In-Part of Ser. No. 705,179, filed July 14, 1976, now abandoned.

FIELD OF THE INVENTION

This invention relates to a method for the prevention of vapor explosion in the process of liquid comminuting, namely, in the process for converting into shot the molten metal and slag produced in metal refining.

DESCRIPTION OF THE PRIOR ART

In the refining of such metals as ferro-chronium, ferromanganese or ferro-nickel, the so-called liquid comminuting treatment is performed for the purpose of converting into shot the molten metal, i.e., metal and slag discharged in a molten form, or the blast-furnace slag.

By liquid comminuting is meant a process for directing the metal or slag in its molten state into a water pit and thereby suddenly cooling the molten metal and producing metal shot in the water. Generally, this process is carried out by flowing a jet of cold water via a nozzle disposed either above or under the water surface of the shotting pit so that the jet of water collides with the molten metal being introduced into the pit. In a conventional liquid comminuting treatment, the phenomenon of vapor explosion has been known to occur as the result of a complicated combination of various factors such as the flow rate of the metal and the slag, the temperature of the metal and the slag, the composition of the metal and the slag, the device employed for carrying out the liquid comminuting process, the dimensions of the liquid comminuting pit and, in addition thereto, the amount and temperature of the water being used for the liquid comminuting.

To prevent this vapor explosion, it has heretofore been a usual practice to determine the safe range of each of the aforementioned factors through experiments and, in the light of accumulated experience, select operating conditions on the basis of the safe ranges of factors thus found and carry out the liquid comminuting treatment in strict accordance with the selected operating conditions. In actual operation, however, no assurance exists that a variation in the operating conditions will not result in a deviation from the fixed conditions. Workers engaged in the liquid comminuting treatment have relied to a great extent solely upon their skill in the regulation of the operating conditions.

SUMMARY OF THE INVENTION

The primary object of this invention is to provide a method for safely and simply preventing vapor explosion in the liquid comminuting process performed such as on metal and slag in metal refining, which method does not require any skill on the part of the operator.

To accomplish the objects described above according to this invention, there is provided a method for the prevention of vapor explosion in the liquid comminuting process performed on molten metal, which method comprises (1) fixing a reference pressure against the pulse pressure generated prevalently in the liquid comminuting, (2) detecting the pulse pressure generated in the liquid comminuting, (3) comparing the generated pulse pressure with the reference pressure and (4) adjusting the flow rate of the molten metal and the water being introduced so as to lower the generated pulse pressure below the reference pressure.

BRIEF DESCRIPTION OF THE DRAWINGS

FIG. 6 is a graph showing the intensity of the input signal in vs. time in FIG. 5.

FIG. 7 is a graph showing pressure vs. time of the A-D converter.

FIG. 8 is a graph showing the number of outputs vs. time of the integrator.

DETAILED DESCRIPTION OF THE PREFERRED EMBODIMENTS

The inventors made a study for the purpose of developing a method capable of providing an objective judgment on measures required to prevent vapor explosion in the liquid comminuting process without reference to the skill of the operator and therefore permitting safe operation of the liquid comminuting treatment.

Figure 2:
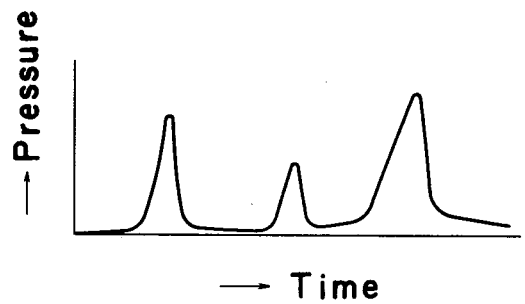
FIG. 2 is a graph showing the time-course change of the explosive pressure generated in the liquid comminuting of molten metal.

As the result of a further study on the aforementioned various factors relating to vapor explosion, it has been learned that the degree of danger of vapor explosion is effected most by the flow rate of the metal and the slag. As was demonstrated by their investigation into the mechanism of explosion, a small explosion forming the core thereof gradually gains in magnitude of pressure with a chain reaction and eventually brings about the vapor explosion. The present invention has been accomplished on the basis of this knowledge. In experimental liquid comminuting operation, numberous pulse pressure occur in the course of water shotting. FIG. 2 shows the process of the generation of such pulse pressures. In the graph, the horizontal axis is time and the vertical axis is pulse pressure. When a multiplicity of small pulses occur all at once, they combine with one another to give rise to a large pulse. The number of large pulses therefore increases in proportion to the frequency of occurrence of small pulses increases. Such large pulses further grow into still larger pulses and, as the growth exceeds the limit, there ensues an explosion.

If the amount of water is sufficiently large for the amount of molten metal, the pulses which occur are dispersed and absorbed in the surrounding body of water and are eliminated in a short span of time and, therefore, are never allowed to grow into larger pulses. With reference to FIG. 2, there is shown the case where the width of the pressure peak is small, namely, the interval between the time the pressure rises and the time the pressure disappears is short. In determining the nature of the pressure which has a bearing on the explosion, therefore, the grand total of the individual pulse pressures within a fixed length of time (pressure multiplied by time, i.e. impulse) must be considered. The present invention provides a method for preventing vapor explosion by placing within the water a detector for sensing the pulse pressure, monitoring the pulse pressure generated in the water and controlling the flow rate of the metal and the water so as to keep the pulse pressure within a safe range.

The method comprises detecting the pulse pressure generated during the liquid comminuting, comparing the detected pulse pressure with the predetermined safe reference pulse pressure and adjusting the flow rate of the metal and the water to prevent vapor explosion. The method is accomplished by a pressure detector inserted in the water with a pressure converter attached as an accessory to the pressure detector adapted to conver the detected pressure into an electric signal, a pressure characteristic integrator connected to the pressure converter and provided with an interval setter and a device connected to the pressure characteristic integrator, provided with a display unit and adapted to indicate the degree of danger.

Figure 1:
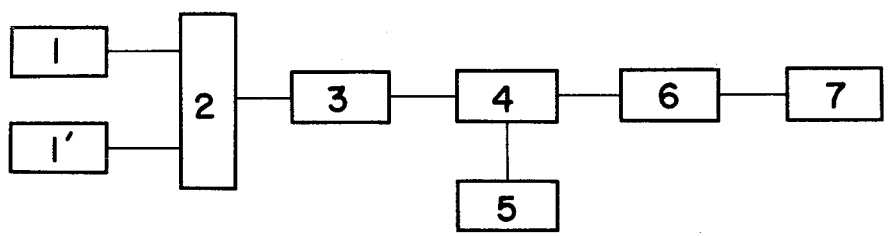
FIG. 1 is a schematical block diagram of components used in carrying out the method of this invention.

FIG. 1 is a block diagram illustrating the construction of the present invention, in which 1, 1' denote a first and second pressure detector. Each pressure detector is a device for detecting the pressure generated during the water shotting. Examples of pressure detectors which are usable herein include a strain meter, a detecting unit utilizing a crystalline element such as rock crystal whose resistance varies with the magnitude of the pressure applied thereto and a detecting unit having two plate electrodes disposed in such way that the distance therebetween may be varied with the pressure applied thereto and the variation of pressure may therefore be detected in the form of corresponding variation in the electrostatic capacity. In the embodiment of FIG. 1, there are provided two detectors. Such detectors 1,1' can be disposed at different positions within the water shotting equipment so that they may freely be switched from one to the other by means of a switching unit 2.

By the pressure detectors 1, 1', the pulse pressure generated within one minute of time can be detected. If a strain meter is used, for example, the pulse pressure of a frequency up to the order of 50 kHz can be detected. The position for the installation of the pressure detector is not specifically limited insofar as it is placed in the water pit such that the pressure detector is not appreciably effected by the pressure of molten metal or the injected flow of water.

In throwing molten metal (or slag metal) into the water pit, cold water is caused to spurt from nozzles to cause the cold water to collide with the molten metal. Part of water in the water pit is affected by the introduction of the molten metal and the cold water. Since it is not preferable that such part of water thus affected in turn affects the pressure detector, it is necessary to install the pressure detector at such a positon.

By reference numeral 3 is denoted a pressure converter which serves to convert the pressure detected by the pressure detectors 1,1', for example, a dynamic strain converter is adopted as the pressure converter. Denoted by reference numeral 4 is a pressure characteristic integrator disposed adjacent to the pressure converter 3 and provided with an interval setter 5. The pressure characteristic integrator 4 is a device for summing the pressure characteristics converted into electric signals by the pressure converted over a time interval, as shown in FIG. 12 (a) fixed by the interval setter 5.

The pressure characteristics or pressure parameters which are of significance in the present invention will be described further. In the graph of FIG. 2, the vertical axis is pressure generated and the horizontal axis is time. This graph shows the change of pressure generated in liquid comminuting along the course of time. It is observed that the pressure, as soon as it is generated, sharply increases to reach its maximum value and at once declines aburptly and vanishes. This means that each pulse occurs in such way as to describe a sharp peak with the elapse of time.

Figure 12A:
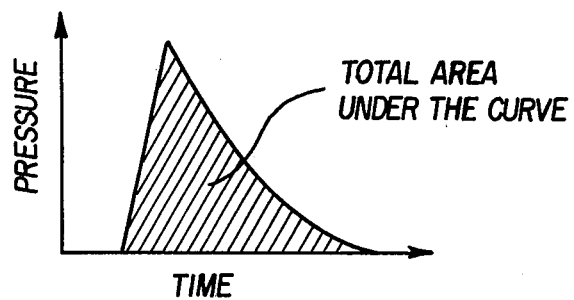
Figure 12B:
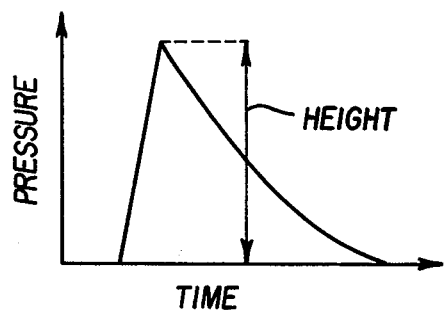
Figure 12C:
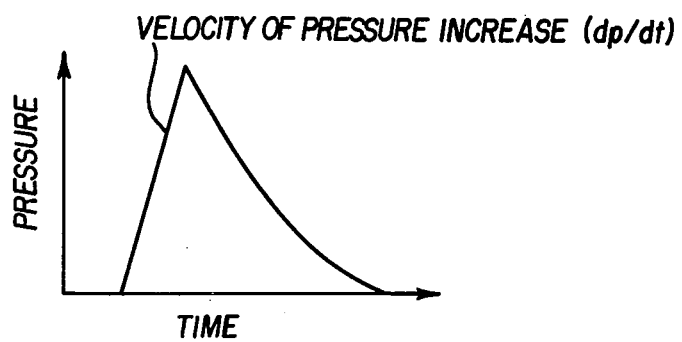

As the pressure characteristics or pressure parameters, there can be used 1) the total area of the individual peaks shown in FIG. 12 (a) and referred to previously, namely the product of the pressure multiplied by time (value of integration) or the pressure impulse, 2) the values of the individual peaks (peak pressure) as shown in FIG. 12 (b), and 3) the velocity of pressure increase of change of pressure with respect to change in time, $dp/dt$, from the time the pressure is generated to the time the pressure reaches its peak as shown in FIG. 12 (c).

Figure 10:
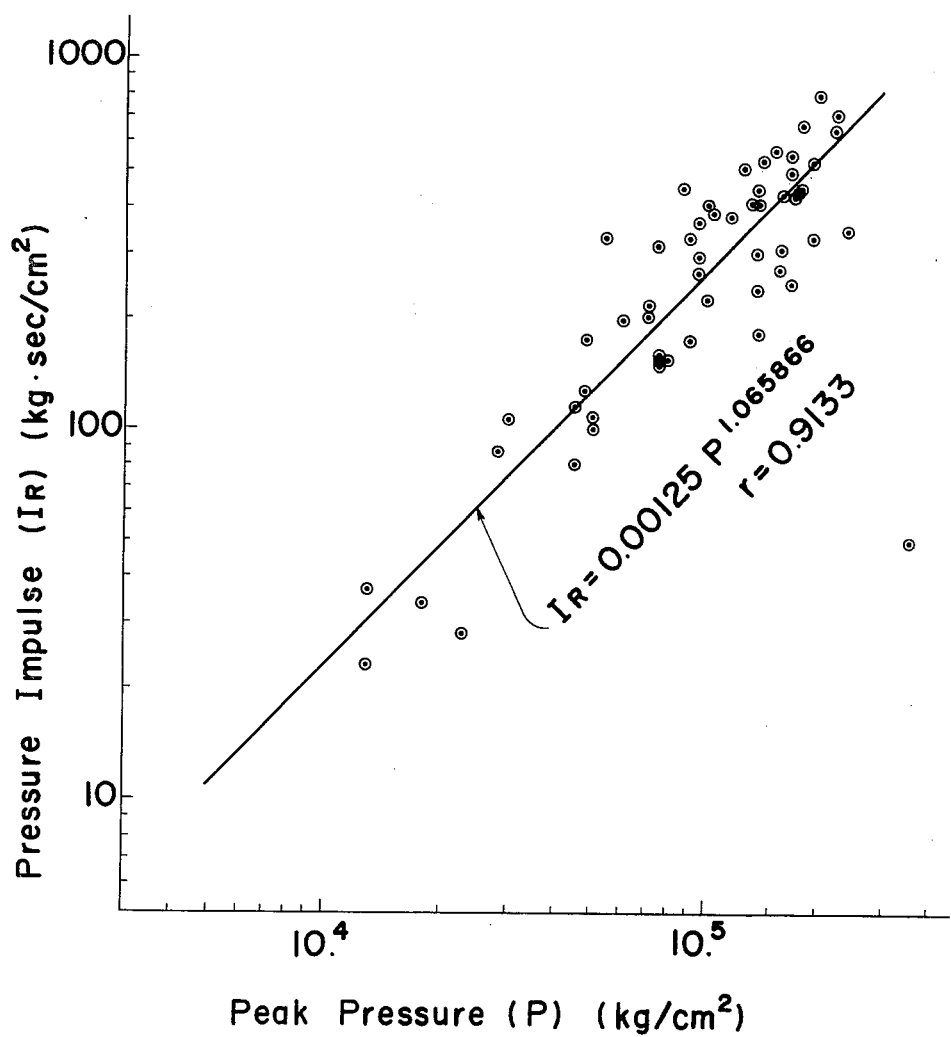
FIG. 10 is a graph showing the correlation between the peak pressures and the pressure impulses.

As described previously, the sum of pressure impulses within a fixed interval of time has a direct bearing upon explosion. It is, therefore, most desirable to use this sum as the criterion for the prevention of explosion. According to an experiment conducted in connection with the present invention, a highly distinct correlation exists, as shown in FIG. 10, between the pressure impulse and the peak pressure. Thus, the judgement required for the purpose of control can also be effected on the basis of the sum of peak pressure. Since the correlation between the rate of pressure increase and the pressure impulse is also discernible, though not so distinctly as that in the case of peak pressure, such judgment can also be accomplished on the basis of the aforementioned velocity of pressure increase.

FIG. 10 shows the relation between the pressure impulse and the peak pressure at the time of vapor explosion determined by an experiment.

This experiment was carried out by placing in a cylindrical container (65 mm in diameter and 125 mm in height) 10 cm$^3$ of water (which volume was selected after a test conducted in the range of from 5 to 50 cm$^3$) and projecting 1 kg of molten lead (at varying temperatures in the range of from 400° to 800° C.) downwardly into the water so as to determine the conditions at which vapor explosion occurs.

As concerns the amount of molten lead, a test conducted in the range of from 0.5 to 5.0 kg indicated use of more than 1 kg of molten lead to be dangerous. Thus, 1 kg of molten lead was used in the experiment. As regards the amount of water, a test conducted in the range of from 5 to 50 cm$^3$ indicated that the probability of the occurrence of vapor explosion was highest for the amount of 10 cm$^3$. Hence, 10 cm$^3$ of water was used in the experiment. The process of generation of pulse pressure in this experiment was as illustrated in FIG. 2. In the experiment, data setting forth pressure impulse as a function of the peak pressure was obtained. By plotting the data, there was obtained the graph of FIG. 10. Wherein the horizontal axis is peak pressure (P) (in kg/cm$^2$) and the vertical axis is pressure impulse ($I_R$) (in kg/sec/cm). The pulse pressure in the experiment was measured by the pressure converter 3 by feeding the corresponding input signal from the pressure detectors 1, 1' into a synchroscope (not shown) to have the signal recorded on an oscilloscope of videoscope (Hitachi SV-512J) (not shown) which was then photographed. The pressure impulse was found by a method based on calculation of the area of the photographically recorded waveforms. Of course, the determination of the pressure impulse may be carried out by use of an electrical device designed to measure the area directly. FIG. 10 indicates that the pressure impulse $I_R$ and the peak pressure P have a relationship, $I_R = 0.00125 P^{1.065866}$, r=0.9133 (n=63) suggesting that a highly distinct correlation exists between the pressure impulse and the peak pressure.

Such pressure characteristics are integrated for time intervals. The fixed time intervals are established by the interval setter 5. The intervals are to be suitably determined to the particular kinds of metal and slag and the conditions of the liquid comminuting treatment.

The fact that the value of the pressure characteristic integrated within any of the fixed time intervals exceeds a fixed level implies danger of explosion. This level is variable with the capacity of liquid comminuting and other similar factors and, therefore, cannot easily be fixed generally. Because of the danger involved, it is not practicable to determine this level by conducting an experiment on each piece of liquid comminuting equipment. One skilled in the art, however, is able to judge safe liquid comminuting conditions in light of his experience. Within this safe range, the liquid comminuting is performed on a trail basis and the pulse pressure characteristic is determined in an actual liquid comminuting operation so as to be used in the regular operation afterward. This safe pressure characteristic is referred to hereinafter as reference pressure. In the actual operation of liquid comminuting, even if efforts are made to control the operation so that it will proceed under a fixed set of conditions, variations in the liquid comminuting conditions such as, for example, a sudden increase in the amount of molten metal being introduced and some form of interference with the smooth circulation of water in the water shotting pit will inevitably take place. In such case, a pressure detector 1 inserted in a pit serves to detect the variation in the water shotting condition and, if the variation is such as to exceed the reference pressure set in advance, the pressure detector causes other components of the apparatus to adjust the liquid comminuting conditions and bring them back into the safe operating range.

In the present invention, the comparison with the reference pressure set in advance is accomplished most advantageously by a method which comprises fixing in advance the value of the integrated pressure characteristic within a predetermined range, comparing with the value fixed in advance the integrated value generated within the predetermined time period during the actual liquid comminuting operation and having the results of the comparison automatically displayed by electric signal.

Further, qualitative judgment can be made by applying the method to an expanded scope (not shown). For example, the required control of the liquid comminuting operation can also be accomplished by acquiring knowledge in advance about the pulse pressure range within which the liquid comminuting can be performed with absolute safety, fixing this pulse pressure as the reference pressure, comparing this pulse pressure with the pulse pressure actually generated in the course of the liquid comminuting operation and adjusting the operating conditions in accordance with the results of such comparison.

Next to the pressure characteristic integrator 4 is disposed a device 6 for determining the degree of danger. This danger determining device functions to compare the data obtained from the pressure characteristic integrator 4 with the reference pressure and to classify the results of the comparison into several ranks. It is so adapted as to issue a signal corresponding to the particular rank under which such results are classified. This rank is displayed on a display unit 7 attached as an accessory to the danger determining device 6 in order for the operator to determine the degree of danger. The ranks are fixed in advance in accordance with the empirical numerical values obtained in past operation. These ranks are displayed in a manner thoroughly discernible by human vision such as, for example, by lighting a blue lamp indicating safety, a yellow lamp indicating necessity for caution and a red lamp indicating danger (not shown). As a precaution, the danger may further be indicated by sounding an alarm (not shown).

When the danger determining device 6 or the display unit 7 is connected to a device for adjusting the flow volume of molten metal or a device for stopping the flow of molten metal, it becomes possible to cut off the flow of molten metal when the danger condition is displayed or to decrease the flow volume of molten metal when the status caution condition is displayed.

The pressure characteristic integrator 4 will be described in full detail with reference to a case involving the use of peak pressure as the pressure characteristic.

Figure 3:
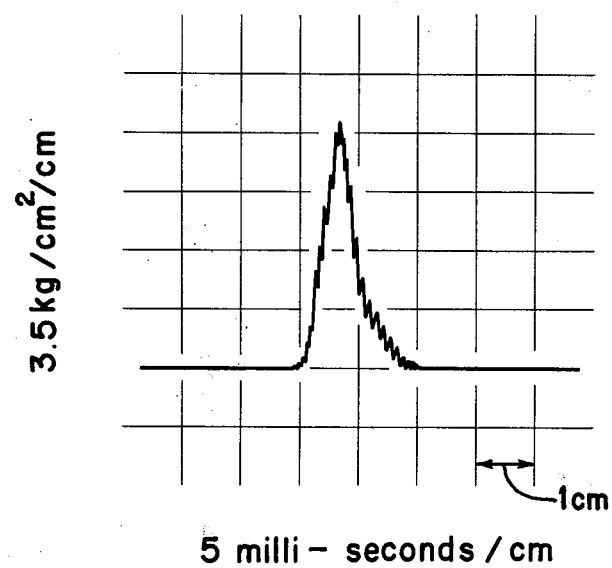
FIG. 3 is a graph showing the pressure impulse in the vapor explosion as determined experimentally with an oscilloscope adapted to display the pressure characteristic.
Figure 4:
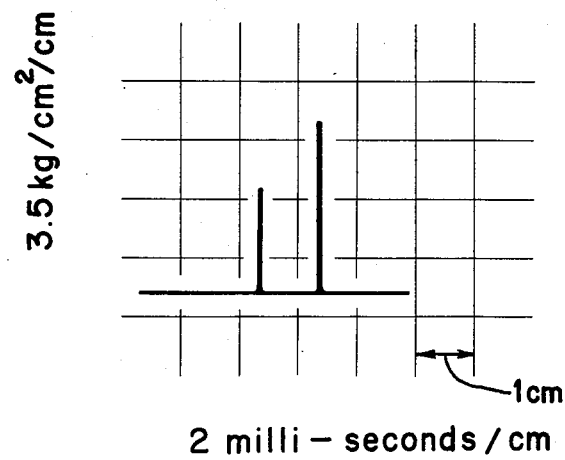
FIG. 4 is a graph showing the pressure impulse indicated by the oscilloscope in the liquid comminuting plant for ferro-chromium refining.

The pressure impulses involved in the liquid comminuting operation as recorded by the aforementioned synchronscope (not shown) actually employed in the liquid comminuting plant for the purpose of indicating the pressure characteristic are shown in FIGS. 3 and 4.

The occurrence of the pressure impulse illustrated in FIG. 3 is a photographic representation of the record obtained in an experiment, wherein Shinko Tsushin K.K.'s Model MP-50 DA-4007 was used as the pressure detector, National VP-543A as the synchronscope and Toshiba TC-30, Hitachi 8V-512J or Toshiba VM-17A as the oscilloscope videoscope (not shown) respectively. In the graph, the horizontal axis represents time (5 milli-seconds/cm) and the vertical axis represents pressure impulse (3.5 kg/cm$^2$/cm).

The occurrence of the pressure impulse illustrated in FIG. 4 is likewise a photographic representation of the record obtained at an actual liquid comminuting plant wherein molten ferro-chromium was poured at a flow speed of 1 to 2 tons per minute into a liquid comminuting pool measuring 6.5 m×9 m×3.5 m receiving a main jet water at a rate of 340 tons/hour. In the graph, the horizontal axis represents time (2 milli-seconds/cm) and the vertical axis represents the pressure impulse (3.5 kg/cm$^2$/cm) respectively.

The waveforms of FIG. 3 and FIG. 4 differ because the flow rates of molten metal introduced per unit volume per unit time (and consequently the magnitudes of heat energy) were different. A greater heat energy in the form of pressure impulse was involved in the case of FIG. 3 as compared with that of FIG. 4.

Figure 5:
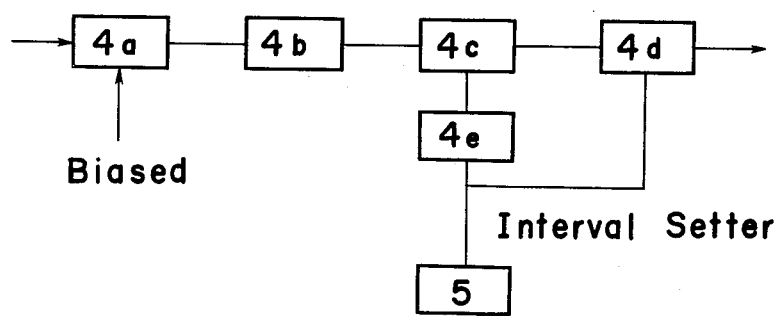
FIG. 5 is a block diagram showing the components comprising the pressure peak integrator.

FIG. 5 is a schematic diagram illustrating the construction of the pressure peak integrator, namely the device of reference numeral 4 in the diagram of FIG. 1.

FIG. 6 shows the form of input signal to the device 4a in FIG. 5. In FIG. 6, the vertical axis represents the intensity of input signal, the horizontal axis represents the length of time and $t_0$ denotes the time set by the interval setter to be subject to integration. In this Figure, the intensity of the input signal is divided into five ranks. The dotted line indicates the bias necessitated for the elimination of noise.

FIG. 5, reference numeral 4a denotes an appropriately biased A-D converter. This converter serves to receive and retain the input signal shown in FIG. 6 for a fixed duration and convert it into an output as shown in FIG. 7.

FIG. 7 is a graph in which the vertical axis represents pressure and the horizontal axis represents the same length of time as that of FIG. 6, with $t_0$ denoting the value to be set by the interval setter 5. The time subjected to integration and the numeral displayed as the peak output are both divided into five ranks.

In FIG. 5, reference numeral 4c denotes an integrator, reference numeral 4d a memory and reference numeral 4e a delay circuit, all of which are connected to the interval setter 5. The delay circuit 4e serves the purpose of retaining the signal received until the next signal arrives. The memory 4d is intended to store the data previously received. The output of the A-D converter shown in FIG. 7 is integrated by the integrator at time intervals $t_0$ and converted into the output as shown in FIG. 8. In this diagram, the number of outputs obtained over the time interval of $t_0$ is 16.

This output is forwarded to the device for determining the degree of danger 6 or danger classifier and subjected to classification in the ranks of "safe", "caution" and "danger", for example. The danger classifier has the function of classifying widely varied signals into a few ranks. This means that a device similar to the A-D converter can be utilized as the danger classifier.

The description so far made has assumed integration of the peak pressure occurs. In the case of integration of the pressure impulses in place of the peak pressure, the present invention can be effected satisfactorily by incorporating an arithmetic unit designed to perform the calculation on the relationship of the peak pressure and the pressure impulse as the device 4b between the device 4a, namely the A-D converter, and the device 4c with reference to the diagram of FIG. 5 and having the related data subjected to calculation on this arithmetic unit.

According to the present invention, the liquid comminuting operation, which has heretofore relied to a notable extent upon the skill of the operator, can be controlled on the basis of objective data to the extent of enabling the operator to foretell the danger of vapor explosion well in advance. Thus, this invention permits the water shotting operation to be carried out with the utmost safety.

Figure 11:
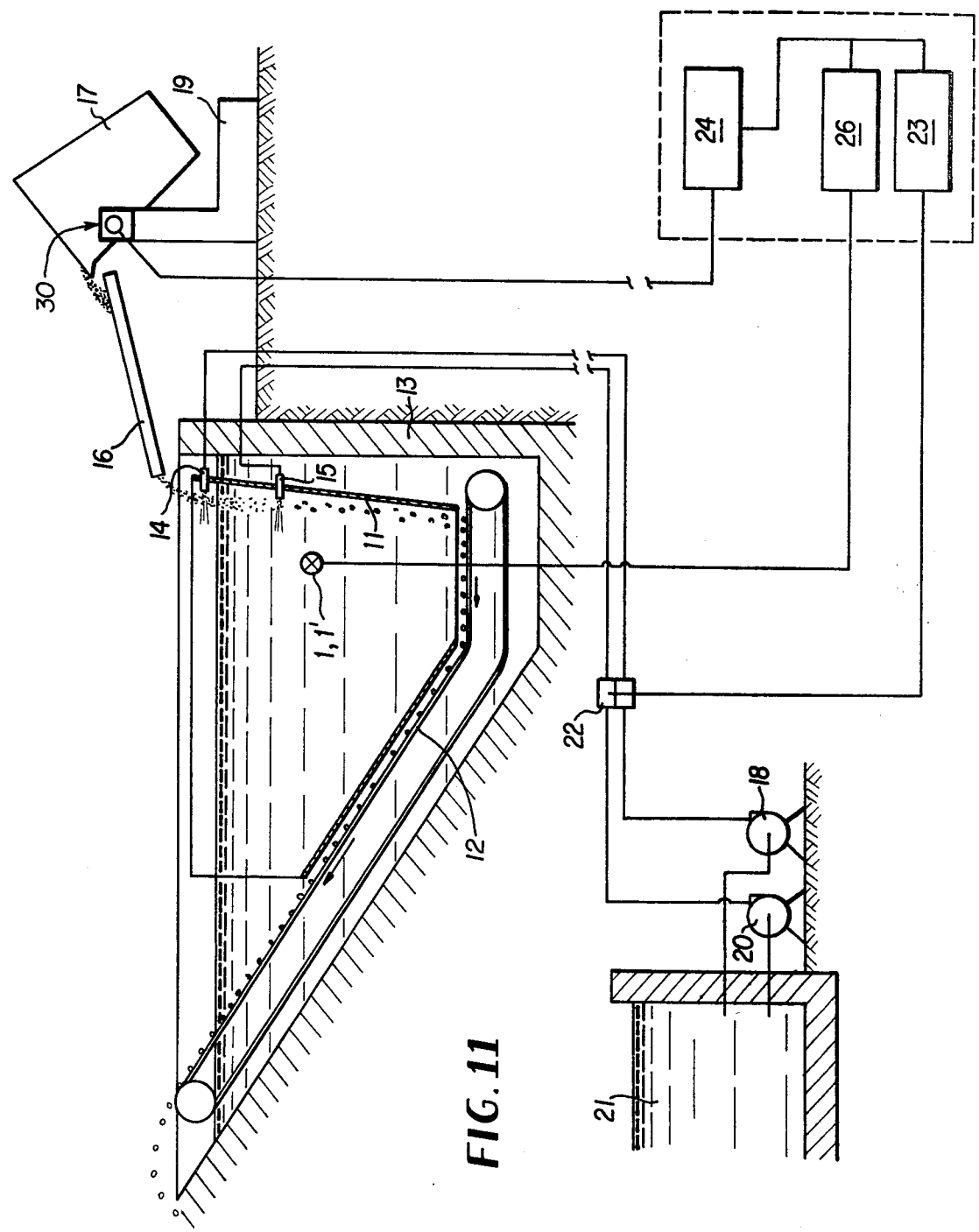
FIG. 11 shows the interrelationship of the structural elements of the present invention, and FIGS. 12 (a), (b), and (c) are graphs of pressure parameters utilized in the present invention.

As shown in FIG. 11, the present invention also provides for molten metal (molten slag) to be accommodated in a ladle 17 and poured through a conduit 16 into a water pit 13 by inclining the ladle by use of a support means 19. The water pit 13 is filled with water. Water supplied from a water tank 21 is jetted from nozzles 14 or 15 by means of pumps 18 or 20, respectively, and collides with the molten metal (molten slag) with the result that the molten metal (molten slag) is converted into metal shots (slag shots). The shots fall onto a pan conveyor 12 through a shot hopper 11 and are then conveyed out of the water pit 13. Pressure detectors, 1, 1' as shown in FIG. 1 are provided in conjunction with pan conveyor 12.

Member 26 for measuring the degree of vapor explosion incorporates therein pressure converter 3 as shown in FIG. 1, pressure characteristic integrator 4, integral setter 5, the device 6 for determining the degree of danger, and, if necessary, display unit 7.

The pressure detected by the pressure detectors 1, 1' is transferred to the member 26 for measuring the degree of danger of vapor explosion similar to that discussed with respect to FIG. 1 which thereby puts a device 24 for adjusting the flow volume of molten metal and for stopping the flow of molten metal into operation. The operation of the device 24 causes support means 19 to function to adjust the inclination of the ladle 17 by an adjusting mechanism 30, with the result that the flow volume of molten metal supplied to the water pit 13 can be adjusted. The present invention also includes means 23 for recording and indicating the flow volume of water supplied to each pipe 14 and 15, device 24, and a pressure detector incorporated in a conventionally known water shotting plant. Means 22 for adjusting the flow volume of water supplied to each pipe is also provided as shown in FIG. 11.

EXAMPLE

By using a water tank (not shown) having an inner volume of 324 m³, molten high-carbon ferro-chromium was subjected to liquid comminuting at a flow rate of 1 to 2 tons per minute, with the main water jet volume fixed at not less than 340 tons/hour.

An apparatus for carrying out the method of this invention having the configuration illustrated in FIG. 1 was used.

Figure 9:
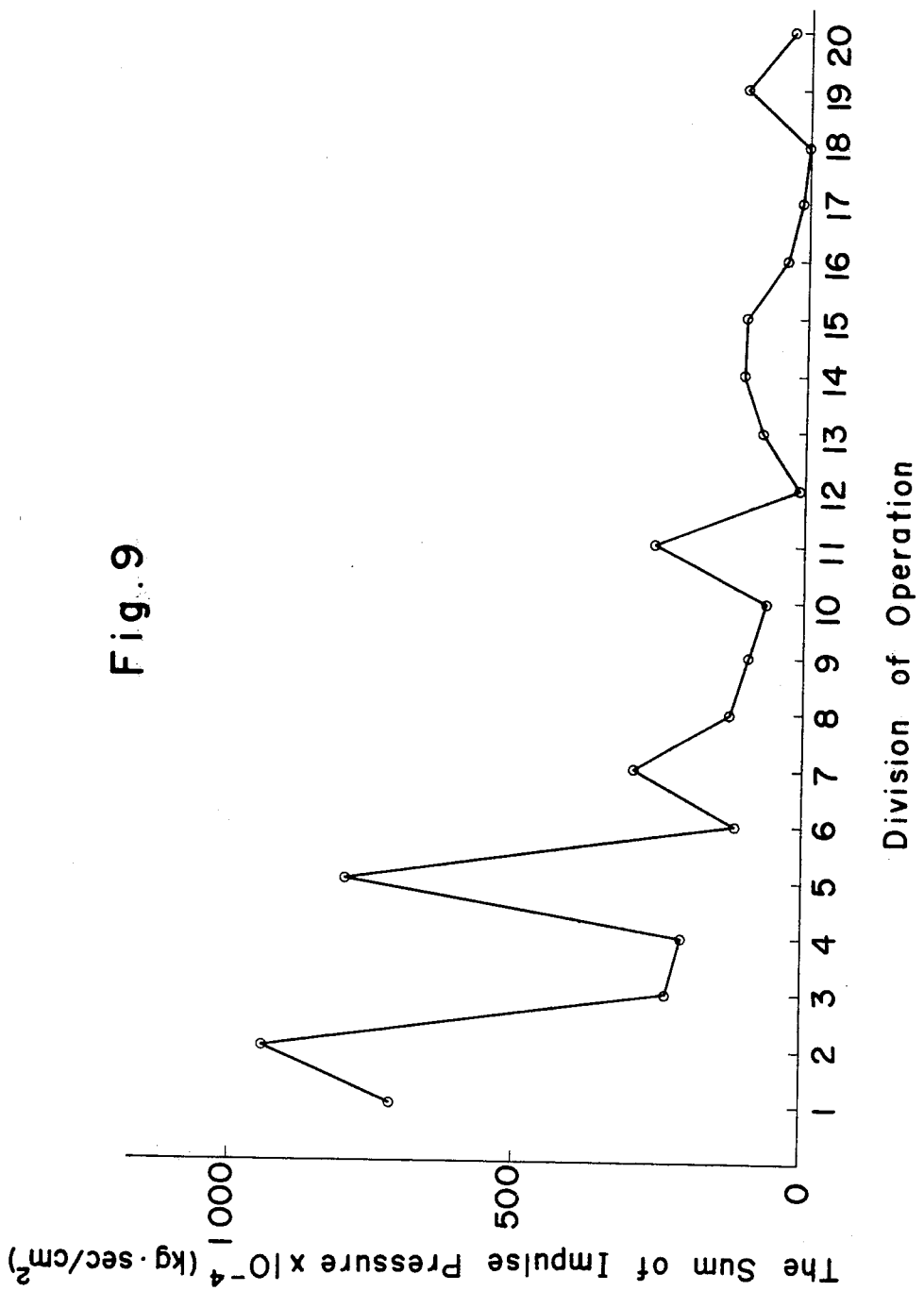
FIG. 9 is a graph showing the relationship between each division of operation of the preferred embodiment and the sum of impulse pressure.

The time of liquid comminuting was divided into 20 equal zones. The sum of impulse pressure during each part of the water shotting operation was calculated from the pressure peak in accordance with the correlation formula of FIG. 10, by following the method of this invention. The results are as shown in FIG. 9. In this particular operation, a pressure impulse of $4000 \times 10^{-4}$ (kg sec/cm²) was used as the reference pressure. In the diagram, the vertical axis is the sum of impulse pressures and the horizontal axis is the division of operation.

When the sum of impulse pressure was large as in operation zones 1 and 2, the operation was controlled so that the amount of molten slag metal being treated would be decreased. When the sum of impulse pressure was small as in operation zones 3 and 4, the operation was controlled so as to decrease the amount of molten slag metal. The liquid comminuting operation, thus, could be continued safely.

Obviously, many modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. In a method for prevention of vapor explosion resulting from vapor suddenly being generated under water in a process of liquid comminuting in metal refining by having one member selected from the group consisting of molten metal and molten slag introduced into water, the improvement therein comprising:
(a) placing a pressure detector under water for detecting peak pressure occuring during cooling of the molten material in the water,
(b) flowing the molten metal material into the water,
(c) detecting a pulse pressure signal generated during the liquid comminuting by vapors suddenly generated under water by flowing the molten material into the water,
(d) comparing the generated pulse pressure signal with a reference pressure, and
(e) adjusting the amount of molten material being introduced and the flow rate of water fed due to the result of comparing the generated pulse pressure signal with the reference pressure so as to lower said generated pulse pressure signal below said reference pressure whereby the prevention of vapor explosion is attained.

2. The improved method for the prevention of vapor explosion in the liquid comminuting of molten metal according to claim 1, wherein the pulse pressure generated comprises a value of impulse pressure generated during the liquid comminuting.

3. The improved method for the prevention of vapor explosion in the liquid comminuting of molten metal according to claim 1, wherein the pulse pressure generated comprises a value of peak pressure generated during the liquid comminuting.

4. The improved method for the prevention of vapor explosion in the liquid comminuting of molten metal according to claim 1, wherein the pulse pressure comprises the rate of pressure increase, $dp/dt$, from the time the pressure is generated to the time the generated pressure reaches the peak during the liquid comminuting.

5. In a method for preventing vapor explosion in a process for liquid comminuting of molten material selected from the group consisting of metal and slag, including introducing a stream of said molten material into a flowing stream of water, wherein said stream of molten metal is atomized into droplets which are then cooled and solidified to form shot, the improvement comprising:
(a) placing within said stream of water a pulse pressure measuring means;
(b) setting an initial reference pressure in said pressure measuring means;
(c) detecting a generated pressure pulse in said water stream upon contact by said molten material;
(d) comparing said generated pressure pulse with said reference pressue pulse; and,
(e) controlling the flow rate of water to produce a reduced pressure pulse below said reference pressure pulse.

* * * * *